Aug. 30, 1960     R. ABRAMS     2,951,107

BATTERY HOLDER

Filed Oct. 23, 1957

Inventor
Ralph Abrams
By Roberts, Cushman & Grover
Attys.

ns of the drawing Figure.

United States Patent Office 2,951,107
Patented Aug. 30, 1960

2,951,107
BATTERY HOLDER

Ralph Abrams, Sharon, Mass., assignor to Cambridge Thermionic Corporation, Cambridge, Mass., a corporation of Massachusetts Filed Oct. 23, 1957, Ser. No. 691,935

3 Claims. (Cl. 136—173)

The field of the present invention is that of holders for electric batteries especially of the type suited for mounting batteries of the mercury cell type in electronic apparatus.

Objects of the invention are to provide battery holders or clips which associate cells securely with panels or similar bases yet do not require tools to insert or to remove the cells but permits easy and wholly manual performance of that operation, to provide such holders which can be provided with solder terminals that can be fastened directly to printed circuit boards if desired, to provide such holders which have a minimum of parts and therefore assure good electrical contacts, to provide battery holders which make it practically impossible to jar the cells loose therefrom, to provide such holders which lend themselves especially well to manufacture from material which is fatigue resistant, and generally to provide such devices which are rugged, easy to manufacture, efficient and convenient in use, and yet comparatively inexpensive.

A brief summary indicating the nature and substance of the invention for attaining the above objects, will serve to define some of its principal aspects as follows.

A battery holder or clip according to the invention has a base made from metallic strip material, one end of which base is bent to form an arm preferably at right angles thereto and which base has at the other end two openings spaced from each other lengthwise of the strip, has a cup shaped front shell of insulating material which is fastened to the arm of the base with metallic means such as a rivet or eyelet for establishing an insulated conductive connection from within the front shell to the outside of the transverse strip end, and has a metallic rear shell with a tubular portion closed at one end and having on its outside in axial alignment two prongs both extending towards the ends of the base strip in opposite directions such that one prong can be inserted into one of the openings of the base strip, the other prong can be moved through the second opening of the base strip, and the rear shell can be axially moved to cause both prongs to engage the base, whereby the ends of a battery can be inserted to make contact at the shells, and will retain the prongs of the rear shell in secure engagement with the base strip.

In a practically important aspect of the invention, the front shell is fastened to the arm of the base strip by means of a perforation in the strip and a short stud shaped perforated extension of the front shell fitting into the perforation of the arm, further by means of an insulating washer on the other side of the strip arm and by a conductive element such as an eyelet for fastening the cup and the washer together; for mounting on printed circuit panels a solder lug is inserted between the washer and one flange of the eyelet. The closure means of the metallic rear shell are preferably inwardly bent fingers stamped with a flat blank of the rear shell which is then bent to form a tube with an open seam on the side opposite to a flat portion with above-mentioned prongs which are likewise stamped with the rear shell blank. These prongs are slightly offset in axial direction parallel to and slightly distanced from the flat side of the shell.

These and other objects and aspects of the invention will appear from the following description of a practical embodiment thereof illustrating its novel characteristics.

The description refers to a drawing in which

Figures 3, 4, 5:
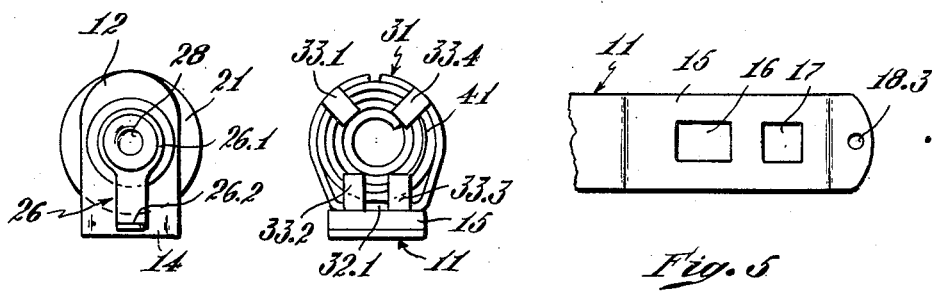
Figs. 3 and 4 are left and right-hand end views, respectively, of the holder.
Fig. 5 is a fragmentary top view of the recessed and perforated end of the base strip.

In the figures, numeral 11 denotes a base strip which is in a preferred embodiment made of Phosphor bronze sheet .032 inch thick, spring tempered, and thereupon silver-plated. One end of this strip is bent transversely thereto at right angles to form an arm indicated at 12, and reinforcing indentations 14 can be provided at the bend. At the other end the strip is recessed at 15 and has two rectangular, axially aligned, openings 16 and 17 (Fig. 5). For purposes of fastening it to a support such as a panel the base strip can be provided with perforations indicated at 18.1, 18.2 and 18.3.

Figure 2:
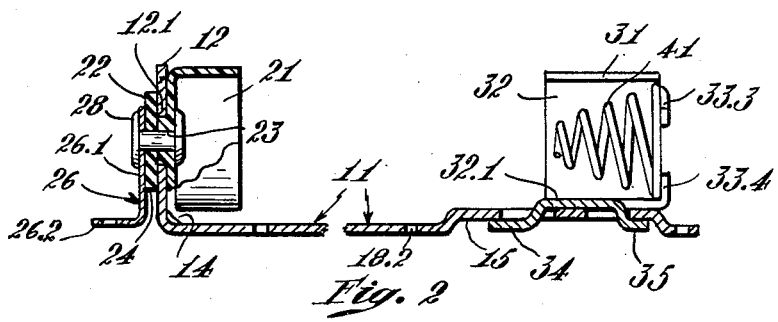
Fig. 2 is a section on line 2—2 of Fig. 1.

Attached to the first mentioned bent over end or arm 12 of the base strip 11 is a front shell in the form of a dish-shaped nylon body 21 which has a stud 22 that is perforated at 23. The stud 22 is inserted into a perforation 12.1 of the arm 12 of the base as shown in Fig. 2, and an insulating washer 24 is aligned with the stud and the arm perforations. In a preferred embodiment there is further applied an alignment with the aforementioned parts, a solder lug 26 having a perforated eye portion 26.1 and a perforated solder terminal portion 26.2. An eyelet 28 preferably made of brass and silver-plated serves to hold together the front shell 21, the base arm 12, the washer 24, and the solder lug 26, and to provide an insulated conductive connection between the inside center of the front shell 21 and the solder lug 26.

Figure 1:
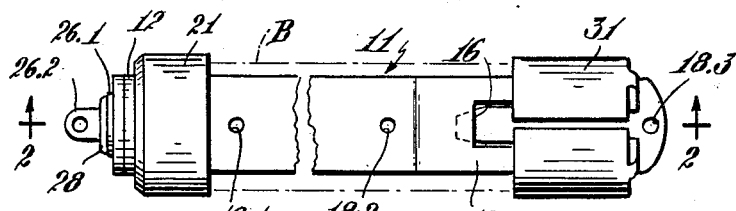
Fig. 1 is a top elevation of a battery holder according to the invention.
Figure 6:
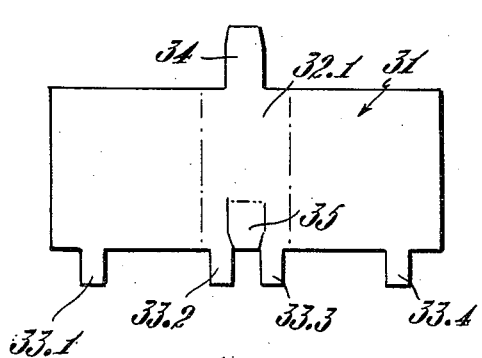
Fig. 6 is a view of the blank from which the removable end shell is fabricated.

The rear shell 31 is stamped from sheet metal for instance 20 B&S gage brass sheet, initially in the form of a blank shown in Fig. 6. This blank is bent and shaped to assume the configuration shown in Figs. 1, 2 and 4 and thereupon silver-plated. After having been finished, this rear shell has a tubular portion 32 flattened at 32.1, radially inward extending closure fingers 33.1 to 33.4, a long prong 34 and a short prong 35. As clearly shown in Fig. 2, the two prongs extend outwardly towards the strip ends in opposite directions, slightly distanced from the flat tubular portion 32.1. The shape and dimensions of these prongs are correlated to the openings 16 and 17 of the recessed portion 15 of the base strip 11, such that the long prong 34 is slightly narrower but longer than the opening 16, and such that the smaller prong 35 is narrower but shorter than the base strip opening 17.

A conically helical spring 41 is inserted in the rear shell 31. This spring is preferably made of material such as beryllium copper wire alloy, spring temperated and silver-plated, squared and ground at both ends, and dimensioned in such a manner that it sits with its wider end with a slight press fit within the shell 31 but returns to free lengths without permanent set.

The operation of battery holders according to the invention is as follows.

Figure 7:
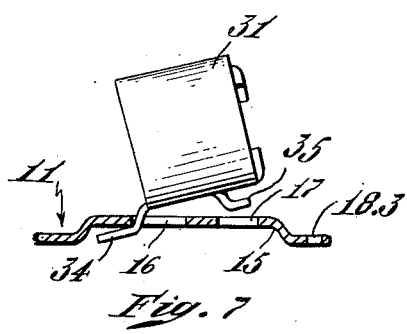
Fig. 7 is a fragmentary section, similar to Fig. 2, of the end shown in Fig. 5, illustrating the manner in which the removable shell is inserted.

As indicated in Fig. 7 the rear shell 31 is mounted on the recessed portion 15 of the base strip 11 by slipping the prong 34 into the opening 15 so far as it will go, this being facilitated by the slightly pointed leading edge of the prong. Thereupon, with the prong 34 touching the inner transverse edge of the opening 16, the shell is lowered such that the shorter prong 35 enters the window 17, whereupon the front end of the rear shell 31 is moved outwardly. The battery B is then inserted into the nylon shell 21, and the rear shell 31 positioned on the corresponding end of the battery. The force of the spring 41 urges the rear shell 31 outwardly until the dependent bent-off portion of the prong 35 touches the outer transverse edge of the opening 17. The rear shell 31 cannot become detached from this position so long as it is urged outwardly by the battery and the spring.

It will now be evident that the rear shell can be very easily applied without any tool whatsoever, that batteries can be inserted and removed very easily from this clip merely by sliding outwardly and if desired slightly tilting the rear shell 31, that base strip 11 of various length—accommodating various battery sizes—can be used with the same shells or with shells of generally similar design but different size, and that the electric contacts throughout the holder proper, and at its terminals—namely base strip 11 and eyelet 28 or solder lug 26—are certain and permanent so long as a battery remains in the holder. It will also be evident that this holder, while fully satisfactory mechanically and electrically, can be fabricated, assembled and mounted in a very inexpensive and simple manner.

It should be understood that the present disclosure is for the purpose of illustration only and that this invention includes all modifications and equivalents which fall within the scope of the appended claims.

I claim:

1. A battery holder comprising: a metallic base having at one end an arm extending transversely thereto and having at the other end two openings spaced lengthwise of the base; a cup shaped front shell made of insulating material fastened to said transverse arm of the base; metallic means for establishing an insulated conductive connection from within said insulating front shell; and a metallic rear shell comprising a tubular portion that is open at one end and has closure means at the other end, and having on its outside two axially spaced prongs extending outwardly in opposite directions such that one prong can be introduced into one of said openings of the base, the other prong can then be moved through the second opening, and the rear shell can thereupon be axially moved to cause both prongs to engage the base; whereby the ends of a battery can be inserted in said shells holding the battery which retains the rear shell prongs in engagement with the base.

2. A battery holder comprising: a base made from an elongate metal strip having at one end a transverse arm having a perforation, and having at the other end an inwardly recessed portion with two axially aligned rectangular openings; a cup shaped front shell made of insulating material and having in its bottom a hole aligned with said perforation of said arm; conductive fastening means extending through said perforation and said hole for establishing an insulated conductive connection from within said insulating front shell; a metallic rear shell comprising a tubular portion having an open end, having at the other end inwardly extending closure portions and having on its outside axially aligned a long and a short prong extending outwardly in opposite directions parallel to and slightly distanced from said tubular portion such that the longer prong can be introduced into the inner one of said openings of the base, the shorter prong can be moved through the second opening and the rear shell can be axially moved to cause both prongs to engage the base; and spring means in said rear shell; whereby the ends of a battery can be inserted in said shells compressing the spring, the shells holding the battery and the battery retaining the rear shell prongs in fixating engagement with the base.

3. A battery holder comprising: a base made from an elongate metal strip having one end bent up to form an arm at right angles thereto and with a perforation near its end, and having at the other end an inwardly recessed portion with two axially aligned rectangular openings, the outer openings being somewhat shorter than the other; a cup shaped front shell made of insulating material and having in its bottom a perforated stud fitting said perforation of said arm; a solder lug having an opening for said stud; an insulating washer aligned with said stud between said solder lug and said arm of the base; metallic fastening means passing through and joining said front shell, said arm, said washer and said solder lug and establishing an insulated conductive connection from within said front shell to said solder lug; a metallic rear shell comprising a tubular portion having an open end, having at the other end radially inward extending tabs and having on its outside axially aligned a long and a short prong extending outwardly in opposite directions parallel to and slightly distanced from said tubular portion such that the longer prong can be introduced into the inner one of said openings of the base, the shorter prong can be moved through the second opening and the rear shell can be axially moved to cause both prongs to engage the base; and spring means in said rear shell; whereby the ends of a battery can be inserted in said shells compressing the spring, the shells holding the battery and the battery retaining the rear shell prongs in fixating engagement with the base.

References Cited in the file of this patent

UNITED STATES PATENTS

| | | |
|---|---|---|
| 911,522 | Patterson | Feb. 2, 1909 |
| 2,090,989 | Van Deventer et al. | Aug. 24, 1937 |
| 2,366,929 | Pfeil | Jan. 9, 1945 |
| 2,397,469 | Casanov | Apr. 2, 1946 |
| 2,410,527 | Schinske | Nov. 5, 1946 |
| 2,426,682 | Hallstream | Sept. 2, 1947 |
| 2,692,944 | Mendelson | Oct. 26, 1954 |